United States Patent [19]

Newingham et al.

[11] 4,009,117

[45] Feb. 22, 1977

[54] METHOD OF MAKING INVERT WATER-IN-OIL EMULSION

[75] Inventors: Thomas D. Newingham, West Chester; Alexander D. Recchuite, Boothwyn, both of Pa.

[73] Assignee: Sun Oil Company of Pennsylvania, Philadelphia, Pa.

[22] Filed: Nov. 5, 1975

[21] Appl. No.: 628,853

[52] U.S. Cl. .................................. 252/309; 252/75; 252/314

[51] Int. Cl.$^2$ .......................................... B01J 13/00

[58] Field of Search ............................ 252/309, 314

[56] References Cited

UNITED STATES PATENTS

| | | | |
|---|---|---|---|
| 2,068,136 | 1/1937 | Hulbert | 252/314 X |
| 2,332,934 | 10/1943 | Rollo et al. | 252/314 X |
| 2,684,949 | 7/1954 | McMillan et al. | 252/314 |
| 2,744,870 | 5/1956 | Stillebroer et al. | 252/309 X |
| 3,234,143 | 2/1966 | Waldmann | 252/309 |
| 3,799,884 | 3/1974 | Young | 252/314 X |

FOREIGN PATENTS OR APPLICATIONS

| | | | |
|---|---|---|---|
| 764,918 | 1/1957 | United Kingdom | 252/314 |

*Primary Examiner*—Richard D. Lovering
*Attorney, Agent, or Firm*—J. Edward Hess; Donald R. Johnson; Paul Lipsitz

[57] ABSTRACT

A simplified procedure for making a water-in-oil emulsion involving passing the water and oil through an open face centrifugal pump, passing the pump effluent through a nozzle, and repeating these two steps until an emulsion is formed.

5 Claims, 1 Drawing Figure

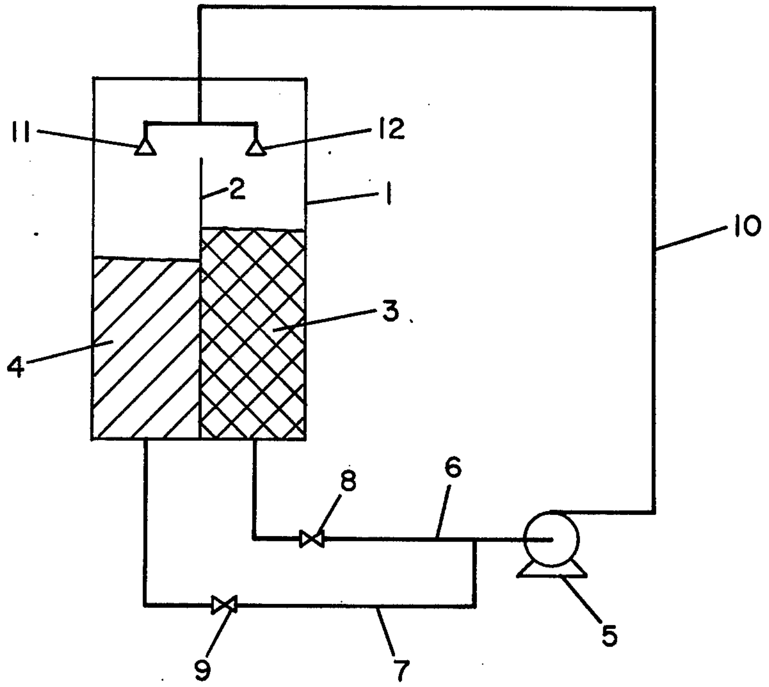
11
12
2
1
10
3
4
8
6
5
9
7

METHOD OF MAKING INVERT WATER-IN-OIL EMULSION

BACKGROUND OF THE INVENTION

Fire resistant hydraulic fluids are widely used in mining operations and these fluids are usually water-in-oil emulsions. Conventionally the hydraulic fluid emulsion is made up by the oil supplied and then shipped to the mine site. Since the fluids are typically 40% water almost half of the shipping costs are for shipping water. Preparation of the emulsion at the mine site would avoid this but this has not been widely practiced heretofore because the emulsification equipment conventionally used is both sophisticated and expensive and, of course, individual emulsification equipment would be needed at each site. If a cheap, simple emulsification process were available the foregoing problems could be eliminated.

SUMMARY OF THE INVENTION

A simple inexpensive process for making very stable water-in-oil emulsion comprises metering the oil and water in the proper proportions through an open face centrifugal pump and then through a nozzle followed by repeated cycles through the pump then nozzles until the emulsion forms. While the equipment involved is conventional off-the-shelf items it has not heretofore been used in such a combination. Indeed, most prior art on mixing recognizes pumps as suitable for only the grossest of mixing jobs. In our invention we achieve emulsions with a particle size of less than one micron and emulsion stabilities as high as at least eight months.

DESCRIPTION

Although our invention is applicable to water-in-oil emulsions generally it will be described with reference to a fire resistant hydraulic fluid.

The base mineral oil employed will usually be paraffinic or naphthenic, preferably not more than 50% naphthenic, but this is not critical as long as it is a hydrocarbon oil. It will usually have a viscosity of 40–200 SUS at 100° F, preferably 70–160 SUS, more preferably 70–100 SUS. The oil may if desired be subjected to conventional refining procedures such as solvent extraction hydrotreating clay finishing and the like.

A surface active agent is employed usually in the amount of 0.1–10%, usually 1–5%. The specific agent employed is not critical and those skilled in the art will recognize that there are literally hundreds of emulsifiers for oil-water emulsions. See for example Kirk-Othmer, ENCYCLOPEDIA OF CHEMICAL TECHNOLOGY, 2nd Edition, 1969, Volume 19, pages 507–592. We have found the various sulfonates, sulfates and phosphonates quite suitable. Other additives can also be included in the oil such as antiwear agents, corrosion inhibitors and the like.

The pump and nozzle and method of water addition are critical elements of the process. The pump employed is an open face centrifugal pump as other types of pumps, even the conventional type centrifugal (closed face), do not provide enough shear to achieve formation of stable, small particle size emulsions. In open face centrifugal pumps, also known as open impeller pumps, the impeller is, as the name implies, open on one side. The impeller is mounted with the open side next to a wear plate with a finite clearance of say 0.01–0.02 inch. Usually there is only about two vanes on the impeller, to lessen the chance of pluggage due to trash in the liquid, and this helps promote shearing and ultimately emulsification of the oil-water mixture. Open face centrifugal pumps are, of course, articles of commerce and thus readily available. One suitable type are those made by the Gorman-Rupp Company. The impeller should turn at a speed of at least 1000 RPM, preferably at least 2000 RPM, more preferably at least 3000 RPM.

The purpose of the nozzle is to provide additional shearing and reduce the time required to form the emulsion. This is done by restricting the flow in the discharge line from the pumps thus increasing the shearing rate in the pump as well. Preferably the restriction reduces the cross-sectional area of that discharge line by one-third, more preferably by one-half. The pressure drop across the nozzle should usually be at least 10 p.s.i., preferably at least 20 p.s.i. The nozzle can be quite sophisticated or can be merely a valve partially closed but is preferably the former in the interests of efficiency. Suitable nozzles are those conventionally used on fire hoses.

The relative proportions of the ingredients will normally be 20–60% water and 40–80% oil, all percentages being by volume, which is equivalent to a water:oil ratio of 0.25:1 to 1.5:1. Preferably the amount of water is 35–50% (water:oil ratio of 0.54:1 to 1:1) as this gives much superior fire resistance while maintaining adequate emulsion stability.

In order to achieve the desired less than two micron particle size, preferably less than one, the water must be added to the oil fairly rapidly. For some reason if the water is added to the oil over a protracted period further circulation through the pump-nozzle systems will not reduce the particle size to 1–2 microns without a very significant increase in circulation time way out of proportion to the increased time to add the water. The water should be added over a period of time which is not greater than three times the time it takes to pump the total water-oil volume through the pump. Thus if 1000 gallons of emulsion is pumped completely in 10 minutes (100 gal per min) then the water should be mixed in over a period of 30 minutes. Ideally the water is mixed in over one time (10 min.) but two times (20 min.) is also suitable. It is recognized that this means that for any given system a mixture of the oil and water may have to be made up and pumped through the system the first time just to see how long it takes and therefore how the water should be added to comply with the above-described requirement. However this is not burdensome and is in fact more practical than alternative schemes.

In manufacturing the emulsion, the temperature should be 50°–140° F. Below 50° F is too cold to form an emulsion and above 140° F the emulsion exists partly as an oil-in-water emulsion.

Once the oil and water are mixed they are circulated through the system again and again until the desired particle size is achieved and the viscosity levels out. After 5–10 repetitions the less than one-two microns will usually be reached but the viscosity will usually not stabilize until 20–60 repetitions have taken place. These numbers will vary with the oil used but in general less than two microns is achieved by 5 repetitions, viscosity stability by 100. Throughout this specification a particle size recitation means that 75% of the particles have the size specified. Preferably 95% of the particles have that size. The 1–2 micron size is important as it contributes greatly to emulsion stability. Our emulsions are stable for at least two months, i.e., there is no water separation on standing at 70° F for two months, preferably four months, more preferably eight months.

DESCRIPTION OF THE DRAWING

The attached FIGURE illustrates one embodiment of the invention.

Tank 1 is shown in cross-section and contains interior wall 2 which divides the tank into two compartments, one indicated at 3 containing 600 gallons of an 80 SUS (100° F) paraffinic solvent extracted mineral oil, the other indicated at 4 containing 400 gallons of water. The 600 gallons of oil includes 45 gallons of additives which are roughly equally divided between zinc dithiophosphate antiwear agent and barium sulfonate and/or phosphonate emulsifier, this additive package being known commercially as Lubrizol 5162.

Pump 5 is a Gorman-Rupp open impeller centrifugal pump Model 13A2-AENLD with a 3 inch discharge. It will pump out the contents of tank 1 in 8 minutes. It receives oil and water through 3 inch lines 6 and 7 respectively at a rate controlled as necessary by valves 8 and 9. The 3 inch discharge line 10 returns the oil-water mixture to tank 1 through fire nozzles 11 and 12. The nozzles are 2½ inches NPT Ackron Turbo Jet Handline Fire Hose Nozzle Style 1725.

In operation pump 5 is started and valve 8 is opened and oil flow is started. Valve 9 is quickly opened to start adding water to the oil and is then adjusted to add the water over a period of 16 minutes which is two times the 8 minutes it takes to pump out tank 1. The rate of water addition can be tracked by following the level in the water side of tank 1. The discharge from pump 5 returns to tank 1 but since there is no agitation in the tank mixing of pump effluent with fresh oil and water still in the tank can be ignored. The pressure in line 10, i.e., the pressure drop across the nozzles, is 30 p.s.i.a. The temperature in the system is 85° F.

After 16 minutes the water is all in and the mixture is allowed to continue to circulate. After one hour the particle size is under one micron and the viscosity was 350 SUS. The viscosity continued to rise until at 3 hours (23 repetitions) it had leveled off at about 410 SUS:

The invention claimed is:

1. Method of making an invert water-in-oil emulsion in a predetermined water to oil volume ratio (W:O) in the range of 0.25:1 to 1.5:1 which comprises:

a. providing containers for water and for oil containing a surface active agent;

b. rapidly supplying the water to the oil containing the surface active agent and supplying the water and oil mixture to the suction side of an open-face centrifugal pump while maintaining the resulting oil-water mixture in said pump at a temperature of 50°–140° F, the rate at which the water is supplied to the oil being such that the time for the water addition is not greater than three times the time required to pump the total water-oil volume through the pump;

c. circulating the effluent from the pump through a nozzle having a cross-sectional area smaller than the discharge of said pump to provide additional shearing action on said oil-water mixture;

d. repeating steps (b) and (c) as many times as necessary until an emulsion of the water in the oil is achieved wherein said emulsion has a particle size of less than 2 microns.

2. Method according to claim 1 wherein said ratio is 40:60.

3. Method according to claim 1 wherein said temperature is 90°–120° F.

4. Method according to claim 1 wherein said oil has a viscosity in the range of 40–200 SUS at 100° F.

5. Method according to claim 1 wherein the W:O ratio is in the range of 0.54:1 to 1:1.

* * * * *